United States Patent
Uchida et al.

(10) Patent No.: US 10,125,213 B2
(45) Date of Patent: Nov. 13, 2018

(54) POLYURETHANE DISPERSION AND POLYURETHANE LAMINATE

(71) Applicant: MITSUI CHEMICALS, INC., Tokyo (JP)

(72) Inventors: Takashi Uchida, Chiba (JP); Chikako Kouda, Sodegaura (JP); Akihiro Oishi, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 155 days.

(21) Appl. No.: 14/908,020

(22) PCT Filed: Jul. 16, 2014

(86) PCT No.: PCT/JP2014/068931
§ 371 (c)(1),
(2) Date: Jan. 27, 2016

(87) PCT Pub. No.: WO2015/016069
PCT Pub. Date: Feb. 5, 2015

(65) Prior Publication Data
US 2016/0159965 A1    Jun. 9, 2016

(30) Foreign Application Priority Data

Jul. 30, 2013  (JP) ................. 2013-157791
Nov. 20, 2013  (JP) ................. 2013-239493

(51) Int. Cl.
| | | |
|---|---|---|
| C08G 18/00 | (2006.01) | |
| B32B 27/18 | (2006.01) | |
| B32B 27/40 | (2006.01) | |
| C08G 18/12 | (2006.01) | |
| C08G 18/75 | (2006.01) | |
| C08G 18/08 | (2006.01) | |
| C08G 18/32 | (2006.01) | |
| C08G 18/34 | (2006.01) | |
| C08G 18/38 | (2006.01) | |
| C08G 18/72 | (2006.01) | |
| C08J 7/04 | (2006.01) | |
| C09D 175/04 | (2006.01) | |
| C08G 18/76 | (2006.01) | |
| C09D 175/12 | (2006.01) | |
| C08G 18/80 | (2006.01) | |

(52) U.S. Cl.
CPC ......... *C08G 18/12* (2013.01); *C08G 18/0823* (2013.01); *C08G 18/0866* (2013.01); *C08G 18/3206* (2013.01); *C08G 18/348* (2013.01); *C08G 18/3893* (2013.01); *C08G 18/724* (2013.01); *C08G 18/757* (2013.01); *C08G 18/758* (2013.01); *C08G 18/7642* (2013.01); *C08G 18/8048* (2013.01); *C08J 7/047* (2013.01); *C09D 175/04* (2013.01); *C09D 175/12* (2013.01); *C08J 2323/12* (2013.01); *C08J 2367/02* (2013.01); *C08J 2475/04* (2013.01)

(58) Field of Classification Search
CPC ............... C08G 18/12; C08G 18/0823; C08G 18/0866; C08G 18/3206; C08G 18/348; C08G 18/3893; C08G 18/724; C08G 18/757; C08G 18/758; C08G 18/7642; C08G 18/8048
USPC ........................................................ 524/839
See application file for complete search history.

(56) References Cited

U.S. PATENT DOCUMENTS

| | | | |
|---|---|---|---|
| 5,750,630 A | 5/1998 | Sengupta | |
| 6,569,533 B1 | 5/2003 | Uchida | |
| 2003/0207122 A1 | 11/2003 | Uchida | |
| 2005/0084686 A1 | 4/2005 | Imaizumi | |
| 2007/0031679 A1 | 2/2007 | Ushida | |
| 2008/0070043 A1 | 3/2008 | Hirota | |
| 2009/0312515 A1* | 12/2009 | Uchida | C08G 18/0823 528/26 |

FOREIGN PATENT DOCUMENTS

| | | |
|---|---|---|
| CN | 1618906 A | 5/2005 |
| CN | 101466754 A | 6/2009 |
| JP | 3509198 | 9/1997 |
| JP | 200198047 | 4/2001 |
| JP | 2005139436 A2 | 6/2005 |
| JP | 20087665 | 1/2008 |
| JP | 2008291143 A2 | 12/2008 |

* cited by examiner

*Primary Examiner* — Kelechi C Egwim
(74) *Attorney, Agent, or Firm* — Rankin, Hill & Clark LLP

(57) ABSTRACT

A polyurethane dispersion is a polyurethane dispersion in which polyurethane resin produced by reaction of an isocyanate group-terminated prepolymer with a chain extender is dispersed in water. The isocyanate group-terminated prepolymer is produced by at least allowing a polyisocyanate component containing xylene diisocyanate and/or hydrogenated xylene diisocyanate to react with a polyol component containing diol having 2 to 6 carbon atoms, a low-molecular-weight polyol having a functionality of three or more, and an active hydrogen group-containing compound containing a hydrophilic group. The chain extender contains an alkoxysilyl compound having a primary amino group, or a primary amino group and a secondary amino group, and the molar ratio of the hydroxyl group in the low-molecular-weight polyol having a functionality of three or more is less than 25% relative to a total mol 100% of the hydroxyl group in the polyol component.

13 Claims, 1 Drawing Sheet

1

1

POLYURETHANE DISPERSION AND POLYURETHANE LAMINATE

TECHNICAL FIELD

The present invention relates to a polyurethane dispersion and a polyurethane laminate; in particular, to a polyurethane laminate that exhibits excellent gas barrier properties, and a polyurethane dispersion used for the polyurethane laminate.

BACKGROUND ART

Conventionally, films composed of a polyvinylidene chloride or vinylidene chloride copolymer (hereinafter abbreviated as PVDC) are known as a film with excellent oxygen gas barrier properties.

However, PVDC generates toxic gas with combustion.

Therefore, films composed of polyvinyl alcohol and an ethylene-vinyl alcohol copolymer are known. However, these films are disadvantageous in that they have poor gas barrier properties under high humidity.

Furthermore, a vapor deposition film in which inorganic oxide is vapor deposited on the film is known as well, but the film is disadvantageous in that it is low in flexibility, and may cause reduction in gas barrier properties with cracks created in secondary operation.

Thus, there has been examined development of a film with excellent gas barrier properties even under high humidity, to be specific, a composite film with gas barrier properties produced as the following has been proposed: for example, a diisocyanate component is allowed to react with a diol component containing C2 to 8 alkylglycol to produce polyurethane resin with gas barrier properties, and a layer including the polyurethane resin and a substrate film layer are laminated. For the method for forming a composite film with gas barrier properties, Patent Document 1 has proposed a method in which water dispersion of polyurethane resin is applied on a substrate film and dried.

CITATION LIST

Patent Document

Patent Document 1: Japanese Unexamined Patent Publication No. 2001-98047

SUMMARY OF THE INVENTION

Problem to be Solved by the Invention

Meanwhile, adherence of the layer including the polyurethane resin to the substrate film layer is required for such a composite film with gas barrier properties, generally.

In this regard, blending of an alkoxysilyl compound as a material component of polyurethane resin to improve adherence is examined.

However, there are disadvantages in that polyurethane resin coagulates in water dispersion and homogeneous layer cannot be formed when the alkoxysilyl compound is blended as the material component in the polyurethane resin with gas barrier properties produced by allowing the diisocyanate component to react with a diol component containing C2 to 8 alkylglycol as described in Patent Document 1.

An object of the present invention is to provide a polyurethane dispersion that has an excellent dispersion state and allows for excellent formation of a polyurethane layer with excellent gas barrier properties and adherence; and a polyurethane laminate produced by using the polyurethane dispersion.

Means for Solving the Problem

A polyurethane dispersion of the present invention is a polyurethane dispersion in which polyurethane resin produced by reaction of an isocyanate group-terminated prepolymer with a chain extender is dispersed in water, wherein the isocyanate group-terminated prepolymer is produced by at least allowing a polyisocyanate component containing xylylene diisocyanate and/or hydrogenated xylylene diisocyanate to react with a polyol component containing diol having 2 to 6 carbon atoms, a low-molecular-weight polyol having a functionality of three or more, and an active hydrogen group-containing compound containing a hydrophilic group; the chain extender contains an alkoxysilyl compound having a primary amino group, or a primary amino group and a secondary amino group; and the molar ratio of the hydroxyl group in the low-molecular-weight polyol having a functionality of three or more is less than 25% relative to the total mol 100% of the hydroxyl group in the polyol component.

A polyurethane laminate of the present invention includes a substrate, and a polyurethane layer laminated on the substrate and made of the polyurethane resin, wherein the polyurethane layer is formed by applying and drying the above-described polyurethane dispersion.

In the polyurethane laminate of the present invention, it is preferable that a layered inorganic compound is dispersed in the polyurethane layer.

Effects of the Invention

The polyurethane dispersion of the present invention contains a low-molecular-weight polyol having a functionality of three or more as a material component at a specific ratio, and therefore even if an alkoxysilyl compound having a primary amino group, or a primary amino group and a secondary amino group is blended as a chain extender, excellent dispersion properties can be ensured. Therefore, a polyurethane layer with excellent gas barrier properties and adherence can be excellently formed.

Furthermore, the polyurethane laminate of the present invention includes the polyurethane layer produced by using the above-described polyurethane dispersion, and therefore has excellent gas barrier properties and adherence.

DESCRIPTION OF EMBODIMENTS

Figure 1:
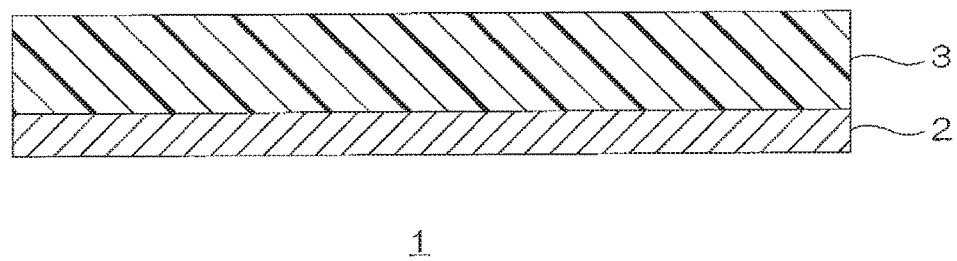
FIG. 1 is a schematic diagram illustrating an embodiment of the polyurethane laminate of the present invention.

A polyurethane dispersion of the present invention is produced by dispersing polyurethane resin (aqueous polyurethane resin) in water, and the polyurethane resin is produced by reaction of an isocyanate group-terminated prepolymer with a chain extender.

The isocyanate group-terminated prepolymer is produced by reaction of a polyisocyanate component with a polyol component.

The polyisocyanate component contains, as an essential component, xylylene diisocyanate and/or hydrogenated xylylene diisocyanate.

Examples of xylylene diisocyanate (XDI) include structural isomers of 1,2-xylylene diisocyanate (o-XDI), 1,3-xylylene diisocyanate (m-XDI), and 1,4-xylylene diisocyanate (p-XDI).

These xylylene diisocyanates may be used singly or in combination of two or more. For the xylylene diisocyanate, preferably 1,3-xylylene diisocyanate, 1,4-xylylene diisocyanate, more preferably 1,3-xylylene diisocyanate is used.

Examples of the hydrogenated xylylene diisocyanate (also called: bis(isocyanatomethyl) cyclohexane) ($H_6XDI$) include structural isomers of 1,2-hydrogenated xylylene diisocyanate (o-$H_6XDI$), 1,3-hydrogenated xylylene diisocyanate (m-$H_6XDI$), and 1,4-hydrogenated xylylene diisocyanate (p-$H_6XDI$).

These hydrogenated xylylene diisocyanates may be used singly or in combination of two or more. For the hydrogenated xylylene diisocyanate, preferably 1,3-hydrogenated xylylene diisocyanate, 1,4-hydrogenated xylylene diisocyanate, more preferably 1,3-hydrogenated xylylene diisocyanate is used.

Examples of xylylene diisocyanate and/or hydrogenated xylylene diisocyanate include their derivatives.

Examples of xylylene diisocyanate and/or hydrogenated xylylene diisocyanate derivatives include multimers (e.g., dimer, trimer (e.g., isocyanurate-modified product, iminooxadiazinedione-modified product), pentamer, heptamer, etc.) of xylylene diisocyanate and/or hydrogenated xylylene diisocyanate, allophanate-modified products (e.g., allophanate-modified product produced by reaction of xylylene diisocyanate and/or hydrogenated xylylene diisocyanate with a low-molecular-weight polyol to be described later, etc.), polyol modified products (e.g., polyol modified product (alcohol adduct) produced by reaction of xylylene diisocyanate and/or hydrogenated xylylene diisocyanate with a low-molecular-weight polyol to be described later, etc.), biuret-modified products (e.g., biuret-modified product produced by reaction of xylylene diisocyanate and/or hydrogenated xylylene diisocyanate with water or amines, etc.), urea-modified products (e.g., urea-modified product produced by reaction of xylylene diisocyanate and/or hydrogenated xylylene diisocyanate with diamine, etc.), oxadiazinetrione-modified products (e.g., oxadiazinetrione produced by reaction of xylylene diisocyanate and/or hydrogenated xylylene diisocyanate with carbon dioxide, etc.), carbodiimide-modified products (carbodiimide-modified product produced by decarboxylation condensation reaction of xylylene diisocyanate and/or hydrogenated xylylene diisocyanate, etc.), urethodione-modified products, and uretonimine-modified products.

These derivatives may be used singly or in combination of two or more.

The polyisocyanate component may contain, as necessary, other polyisocyanates.

Examples of the other polyisocyanates include polyisocyanates such as aromatic polyisocyanates, aralkyl polyisocyanates (excluding xylylene diisocyanate), aliphatic polyisocyanates, and alicyclic polyisocyanates (excluding hydrogenated xylylene diisocyanate).

Examples of the aromatic polyisocyanate include aromatic diisocyanates such as tolylene diisocyanate (2,4- or 2,6-tolylene diisocyanate or a mixture thereof) (TDI), phenylenediisocyanate (m-, p-phenylenediisocyanate or a mixture thereof), 4,4'-diphenyl diisocyanate, 1,5-naphthalene diisocyanate (NDI), diphenylmethanediisocyanate (4,4'-, 2,4'- or 2,2'-diphenylmethanediisocyanate or a mixture thereof) (MDI), 4,4'-toluidine diisocyanate (TODI), and 4,4'-diphenylether diisocyanate.

Examples of the aralkyl polyisocyanate (excluding xylylene diisocyanate) include aralkyl diisocyanates such as tetramethylxylylene diisocyanate (1,3- or 1,4-tetramethylxylylene diisocyanate or a mixture thereof) (TMXDI), and ω,ω'-diisocyanate-1,4-diethylbenzene.

Examples of the aliphatic polyisocyanate include aliphatic diisocyanates such as trimethylenediisocyanate, 1,2-propylenediisocyanate, butylenediisocyanate (tetramethylenediisocyanate, 1,2-butylenediisocyanate, 2,3-butylenediisocyanate, and 1,3-butylenediisocyanate), 1,5-pentamethylenediisocyanate (PDI), 1,6-hexamethylenediisocyanate (also called: hexamethylenediisocyanate) (HDI), 2,4,4- or 2,2,4-trimethylhexamethylenediisocyanate, and 2,6-diisocyanatemethyl caproate.

Examples of the alicyclic polyisocyanate (excluding hydrogenated xylylene diisocyanate) include alicyclic diisocyanates such as 1,3-cyclopentane diisocyanate, 1,3-cyclopentene diisocyanate, cyclohexanediisocyanate (1,4-cyclohexanediisocyanate, 1,3-cyclohexanediisocyanate), 3-isocyanatomethyl-3,5,5-trimethylcyclohexyl isocyanate (also called: isophoron diisocyanate) (IPDI), methylenebis (cyclohexyl isocyanate) (also called: bis(isocyanatocyclohexyl)methane) (4,4'-, 2,4- or 2,2'-methylenebis(cyclohexyl isocyanate), their Trans,Trans-isomer, Trans,Cis-isomer, Cis,Cis-isomer, or a mixture thereof) ($H_{12}MDI$), methylcyclohexanediisocyanate (methyl-2,4-cyclohexanediisocyanate, methyl-2,6-cyclohexanediisocyanate), and norbornanediisocyanate (various isomer or a mixture thereof) (NBDI). Preferably, 4,4'-methylenebis(cyclohexyl isocyanate) is used.

Examples of the other polyisocyanate include the above-described derivatives.

These other polyisocyanates may be used singly or in combination of two or more. Preferably, aralkyl polyisocyanate and alicyclic polyisocyanate are used, more preferably, alicyclic polyisocyanate, even more preferably, bis(isocyanatocyclohexyl)methane is used.

When the other polyisocyanates (excluding xylylene diisocyanate and hydrogenated xylylene diisocyanate) are to be blended, the mixing ratio thereof is, for example, 30 parts by mass or less, preferably 20 parts by mass or less, generally 1 part by mass or more relative to 100 parts by mass of xylylene diisocyanate and/or hydrogenated xylylene diisocyanate (when they are used in combination, their total).

Preferably, xylylene diisocyanate and bis(isocyanatocyclohexyl)methane are used in combination.

By using xylylene diisocyanate and bis(isocyanatocyclohexyl)methane in combination, a polyurethane dispersion with excellent dispersion properties and a small average particle size is produced.

When xylylene diisocyanate and bis(isocyanatocyclohexyl)methane are used in combination, for example, 60 parts by mass or more, preferably 70 parts by mass or more, more preferably 80 parts by mass or more, and for example, 95 parts by mass or less, preferably 93 parts by mass or less, more preferably 90 parts by mass or less of xylylene diisocyanate is mixed relative to 100 parts by mass of a total amount of xylylene diisocyanate and bis(isocyanatocyclohexyl)methane. For example, 5 parts by mass or more, preferably 7 parts by mass or more, more preferably 10 parts by mass or more, and for example, 40 parts by mass or less, preferably 30 parts by mass or less, more preferably 20 parts by mass or less of bis(isocyanatocyclohexyl)methane is mixed relative to 100 parts by mass of a total amount of xylylene diisocyanate and bis(isocyanatocyclohexyl)methane.

The polyol component contains, as essential components, diol having 2 to 6 carbon atoms, a low-molecular-weight polyol having a functionality (valency) of three or more, and an active hydrogen group-containing compound containing a hydrophilic group.

The diol having 2 to 6 carbon atoms is an organic compound having two hydroxyl groups and having 2 to 6 carbon atoms, to be specific, examples thereof include alkanediol having 2 to 6 carbon atoms (alkyleneglycol having 2 to 6 carbon atoms) such as ethylene glycol, propylene glycol, 1,3-propanediol, 1,4-butyleneglycol, 1,3-butyleneglycol, 1,2-butyleneglycol, 1,5-pentanediol, 1,6-hexanediol, neopentyl glycol, 3-methyl-1,5-pentanediol, and 1,3- or 1,4-cyclohexanediol; etherdiol having 2 to 6 carbon atoms such as diethylene glycol, triethylene glycol, and dipropylene glycol; and alkenediol having 2 to 6 carbon atoms such as 1,4-dihydroxy-2-butene.

These diols having 2 to 6 carbon atoms may be used singly or in combination of two or more.

For the diol having 2 to 6 carbon atoms, preferably, alkanediol having 2 to 6 carbon atoms, more preferably, ethylene glycol is used.

For example, 50 parts by mass or more, preferably 55 parts by mass or more, and for example, 80 parts by mass or less, preferably 75 parts by mass or less of the diol having 2 to 6 carbon atoms is mixed relative to 100 parts by mass of a total of the polyol component.

The molar ratio of the hydroxyl group in diol having 2 to 6 carbon atoms relative to a total mol 100% of the hydroxyl group in the polyol component is, for example, 90% or less, preferably 85% or less, more preferably 80% or less, and for example, 50% or more, preferably 55% or more, more preferably 60% or more.

The low-molecular-weight polyol having a functionality of three or more is an organic compound having a number average molecular weight of 400 or less and having three or more hydroxyl groups in one molecular, and examples thereof include trihydric alcohols (low-molecular-weight triol) such as glycerin, 2-methyl-2-hydroxymethyl-1,3-propanediol, 2,4-dihydroxy-3-hydroxymethylpentane, 1,2,6-hexanetriol, trimethylolpropane, and 2,2-bis(hydroxymethyl)-3-butanol; tetrahydric alcohols such as tetramethylolmethane (pentaerythritol) and diglycerol; pentahydric alcohol such as xylitol; hexahydric alcohols such as sorbitol, mannitol, iditol, dulcitol, altritol, inositol, and dipentaerythritol; heptahydric alcohol such as perseitol; and octahydric alcohol such as sucrose.

Examples of the low-molecular-weight polyol having a functionality of three or more also include polyalkylene oxide having a number average molecular weight of 400 or less and a functionality of three or more. Such polyalkylene oxide can be produced as polyethylenepolyol, polypropylenepolyol, and polyethylenepolypropylenepolyol (random or block copolymer), for example, by subjecting alkylene oxide such as ethylene oxide and/or propylene oxide to addition reaction with the above-described low-molecular-weight polyol having a functionality of three or more or a known polyamine as an initiator.

These low-molecular-weight polyols having a functionality of three or more may be used singly or in combination of two or more.

For the low-molecular-weight polyol having a functionality of three or more, preferably trihydric alcohol (low-molecular-weight triol) and tetrahydric alcohol are used, more preferably trihydric alcohol (low-molecular-weight triol) is used, even more preferably, trimethylolpropane and glycerin are used.

For example, 5 parts by mass or more, preferably 8 parts by mass or more, for example, 25 parts by mass or less, preferably 22 parts by mass or less of the low-molecular-weight polyol having a functionality of three or more is mixed relative to 100 parts by mass of a total of the polyol component.

For example, 5 parts by mass or more, preferably 8 parts by mass or more, and for example, 40 parts by mass or less, preferably 35 parts by mass or less of the low-molecular-weight polyol having a functionality of three or more is mixed relative to 100 parts by mass of a total of diol having 2 to 6 carbon atoms and trihydric alcohol when diol having 2 to 6 carbon atoms and the low-molecular-weight polyol having a functionality of three or more are used in combination.

The molar ratio of the hydroxyl group in the low-molecular-weight polyol having a functionality of three or more relative to a total mol 100% of the hydroxyl group in the polyol component is, less than 25%, preferably 20% or less, more preferably 18% or less, and for example, 1% or more, preferably 2% or more, more preferably 3% or more.

When the molar ratio of the hydroxyl group in the low-molecular-weight polyol having a functionality of three or more relative to a total mol of the hydroxyl group in the polyol component is in the above-described range, even if the alkoxysilyl compound having a primary amino group, or a primary amino group and a secondary amino group is blended as a chain extender (described later), excellent dispersion properties can be ensured. Therefore, a polyurethane layer with excellent gas barrier properties and adherence can be formed excellently.

The active hydrogen group-containing compound containing a hydrophilic group is a compound containing a hydrophilic group such as a nonionic group or an ionic group and an active hydrogen group such as an amino group or a hydroxyl group, to be specific, for example, examples thereof include an active hydrogen group-containing compound containing a nonionic group and an active hydrogen group-containing compound containing art ionic group.

Examples of the active hydrogen group-containing compound containing a nonionic group include polyoxyethylene glycol, one-end-terminated polyoxyethylene glycol, and polyols containing polyoxyethylene side chain.

The polyol containing polyoxyethylene side chain is an organic compound containing a polyoxyethylene group in the side chain and having two or more hydroxyl groups, and can be synthesized as follows.

That is, first, the above-described diisocyanate and the one-end-terminated polyoxyethylene glycol (e.g., alkoxypolyoxyethylenemonol having its one-end-terminated with an alkyl group having 1 to 4 carbon atoms, number average molecular weight 200 to 6000, preferably 300 to 3000) is subjected to urethane-forming reaction at a ratio such that the isocyanate group of diisocyanate is in excess relative to the hydroxyl group of the one-end-terminated polyoxyethylene glycol, and as necessary unreacted diisocyanate is removed, thereby producing polyoxyethylene-chain containing monoisocyanate.

Then, the polyoxyethylene chain-containing monoisocyanate and dialkanolamine (e.g., diethanolamine, etc.) are subjected to urea reaction at such a proportion that the isocyanate group of the polyoxyethylene group-containing monoisocyanate is substantially equal with the secondary amino group of dialkanolamine.

In the active hydrogen group-containing compound containing a nonionic group, the nonionic group, to be specific, polyoxyethylene group has a number average molecular weight of, for example, 600 to 6000.

For the diisocyanate for production of polyol containing polyoxyethylene side chain, preferably, aliphatic diisocyanate such as hexamethylenediisocyanate (HDI), and alicyclic diisocyanates such as 1,4- or 1,3-bis(isocyanatomethyl) cyclohexane ($H_6$XDI), 3-isocyanatomethyl-3,5,5-trimethylcyclohexyl isocyanate (also called: isophoron diisocyanate) (IPDI) 4,4'-methylenebis(cyclohexyl isocyanate) ($H_{12}$MDI), and 2,6-bis(isocyanatomethyl) norbornane (NBDI) are used.

The active hydrogen group-containing compound containing an ionic group is an organic compound having a combination of an anionic group such as carboxylic acid, a cationic group such as quaternary amine, and an active hydrogen group such as two or more hydroxyl groups or an amino group, preferably, an organic compound having a combination of an anionic group and two or more hydroxyl groups, more preferably, an organic compound having a combination of carboxylic acid and two hydroxyl groups (active hydrogen group-containing compound containing a carboxy group (e.g., carboxy group-containing polyol, etc.)).

Examples of the carboxy group-containing polyol include polyhydroxy alkanoic acids such as 2,2-dimethylolacetic acid, 2,2-dimethylollactic acid, 2,2-dimethylolpropionic acid (also called: dimethylolpropionic acid), 2,2-dimethylolbutanoic acid, 2,2-dimethylolbutyric acid, and 2,2-dimethylol valeric acid, and preferably 2,2-dimethylolpropionic acid is used.

These active hydrogen group-containing compounds containing a hydrophilic group may be used singly or in combination, preferably, an active hydrogen group-containing compound containing an ionic group, more preferably, carboxy group-containing polyol is used, even more preferably, polyhydroxy alkanoic acid is used.

By blending polyhydroxy alkanoic acid, more improvement in gas barrier properties, adherence to substrate, and transparency can be achieved.

For example, 20 parts by mass or more, preferably 25 parts by mass or more, and for example, 50 parts by mass or less, preferably 40 parts by mass or less of the active hydrogen group-containing compound containing a hydrophilic group is mixed relative to 100 parts by mass of a total of the polyol component.

The molar ratio of the hydroxyl group in the active hydrogen group-containing compound containing a hydrophilic group relative to a total mol 100% of the hydroxyl group in the polyol component is, for example, 35% or less, preferably 30% or less, more preferably 25% or less, and for example, 7% or more, preferably 10% or more, more preferably 12% or more.

The polyol component may contain, in addition, as an optional component, other polyol compounds (excluding the above-described diol having 2 to 6 carbon atoms, low-molecular-weight polyol having a functionality of three or more, and active hydrogen group-containing compound containing a hydrophilic group).

For the polyol compound, a low-molecular-weight polyol excluding the above-described diol having 2 to 6 carbon atoms, low-molecular-weight polyol having a functionality of three or more, and active hydrogen group-containing compound containing a hydrophilic group is used. To be specific, for example, alkane-1,2-diol having 7 to 20 carbon atoms, 2,6-dimethyl-1-octene-3,8-diol, 1,3- or 1,4-cyclohexanedimethanol and a mixture thereof, dihydric alcohol (diol) having 7 or more carbon atoms such as hydrogenated bisphenol A and bisphenol A are used.

Examples of the low-molecular-weight polyol (excluding the above-described diol having 2 to 6 carbon atoms, low-molecular-weight polyol having a functionality of three or more, and active hydrogen group-containing compound containing a hydrophilic group) also include dihydric polyalkylene oxide having a number average molecular weight of 400 or less. Such polyalkylene oxide can be produced as, for example, polyethylene glycol, polypropylene glycol, polyethylene polypropylene glycol (random or block copolymer) by subjecting alkylene oxides such as ethylene oxide and/or propylene oxide to addition reaction with the above-described dihydric alcohol as an initiator. Examples thereof also include polytetramethylene ether glycol having a number average molecular weight of 400 or less produced by ring-opening polymerization of tetrahydrofuran.

These low-molecular-weight polyols (excluding the above-described diol having 2 to 6 carbon atoms, low-molecular-weight polyol having a functionality of three or more, and active hydrogen group-containing compound containing a hydrophilic group) may be used singly or in combination of two or more.

When the low-molecular-weight polyol (excluding the above-described diol having 2 to 6 carbon atoms, low-molecular-weight polyol having a functionality of three or more, and active hydrogen group-containing compound containing a hydrophilic group) is blended, for example, 90 parts by mass or less, preferably 70 parts by mass or less of the low-molecular-weight polyol is mixed relative to 100 parts by mass of a total of the polyol component.

The polyol component preferably consists of diol having 2 to 6 carbon atoms, low-molecular-weight polyol having a functionality of three or more, and active hydrogen group-containing compound containing a hydrophilic group.

To synthesize the isocyanate group-terminated prepolymer, the above-described components are blended at a rate such that the equivalent ratio (isocyanate group/active hydrogen group) of the isocyanate group relative to the active hydrogen group (hydroxyl group and amino group) is more than 1, preferably 1.1 to 10. Then, the above-described components are allowed to react by a known polymerization methods such as bulk polymerization and solution polymerization, preferably by solution polymerization with which reactivity and viscosity can be easily adjusted.

In bulk polymerization, for example, the above-described components are blended under a nitrogen atmosphere, and allowed to react at a reaction temperature of 75 to 85° C. for about 1 to 20 hours.

In solution polymerization, for example, the above-described components are blended in an organic solvent (solvent) under a nitrogen atmosphere, and allowed to react at a reaction temperature of 20 to 80° C. for about 1 to 20 hours.

Examples of the organic solvent include those which are inactive to isocyanate groups and are highly hydrophilic, for example, acetone, methyl ethyl ketone, ethyl acetate, tetrahydrofuran, and acetonitrile.

The polymerization reaction is performed, until the isocyanate group content of the reaction solution is 15 mass % or less, preferably 10 mass % or less.

In the above-described polymerization, as necessary, for example, amine-based, tin-based, or lead-based reaction catalysts can be added, and unreacted polyisocyanate (including xylylene diisocyanate and/or hydrogenated xylylene diisocyanate) can be removed from the produced isocyanate group-terminated prepolymer, by a known method such as distillation and extraction.

When, for example, an anionic group is contained, preferably, a neutralizing agent is added to neutralize to form a salt of the anionic group.

Examples of the neutralizing agent include a common use base, for example, organic bases (e.g., tertiary amines (trialkylamine having 1 to 4 carbon atoms such as trimethylamine and triethylamine, alkanolamines such as dimethylethanolamine, methyldiethanolamine, triethanolamine, and triisopropanolamine, and heterocyclic amines such as morpholine, etc.)), inorganic bases (ammonia, alkali metal hydroxide (lithium hydroxide, sodium hydroxide, potassium hydroxide, etc.), alkaline earth metal hydroxides (magnesium hydroxide, calcium hydroxide, etc.), and alkali metal carbonates (sodium carbonate, potassium carbonate, etc.)). These bases can be used alone or in combination of two or more.

The neutralizing agent is added, per 1 equivalent of anionic group, 0.4 equivalent or more, preferably 0.6 equivalent or more, and for example, 12 equivalent or less, preferably 1 equivalent or less.

The thus produced isocyanate group-terminated prepolymer is a polyurethane prepolymer having two or more free isocyanate groups at its molecular terminal, and the isocyanate group content (isocyanate group content based on the solid content excluding the solvent) is, for example, 0.3 mass % or more, preferably 0.5 mass % or more, more preferably 1.0 mass % or more, and for example, 15 mass % or less, preferably 12 mass % or less, more preferably 10 mass % or less.

The isocyanate group has an average functionality of, for example, 1.5 or more, preferably 1.9 or more, more preferably 2.0 or more, and for example, 3.0 or less, preferably 2.5 or less.

When the isocyanate group has an average functionality in the above-described range, a stable dispersion of the above-described polyurethane can be produced, and substrate adherence and gas barrier properties can be secured.

The number average molecular weight (number average molecular weight determined by (GPC measurement using standard polystyrene as the calibration curve) is, for example, 500 or more, preferably 800 or more, and for example, 10000 or less, preferably 5000 or less.

The isocyanate group-terminated prepolymer has a hydrophilic group concentration of, for example, 0.1 mmol/g or more, preferably 0.2 mmol/g or more, and for example, 1.2 mmol/g or less, preferably 1.0 mmol/g or less, more preferably 0.8 mmol/g or less.

When the isocyanate group-terminated prepolymer has a hydrophilic group concentration in the above-described range, stable dispersion of the above-described polyurethane can be produced.

Next, in this method, the isocyanate group-terminated prepolymer produced as described above is allowed to react with a chain extender in, for example, water, thereby producing a polyurethane dispersion of polyurethane resin.

The chain extender contains, as an essential component, an alkoxysilyl compound having a primary amino group, or a primary amino group and a secondary amino group.

Examples of the alkoxysilyl compound having a primary amino group, or a primary amino group and a secondary amino group include an alkoxysilyl compound having a primary amino group such as γ-aminopropyltrimethoxysilane, γ-aminopropyltriethoxysilane, and N-phenyl-γ-aminopropyltrimethoxysilane; and an alkoxysilyl compound having a primary amino group and a secondary amino group such as N-β(aminoethyl)γ-aminopropyltrimethoxysilane (also called: N-2-(aminoethyl)-3-aminopropyltrimethoxysilane), N-β(aminoethyl)γ-aminopropyltriethoxysilane (also called: N-2-(aminoethyl)-3-aminopropyltriethoxysilane), N-β(aminoethyl)γ-aminopropylmethyldimethoxysilane (also called: N-2-(aminoethyl)-3-aminopropylmethyldimethoxysilane), and N-β(aminoethyl)γ-aminopropylmethyldiethoxysilane (also called: N-2-(aminoethyl)-3-aminopropylmethyldiethoxysilane).

These alkoxysilyl compounds having a primary amino group, or a primary amino group and a secondary amino group may be used singly or in combination of two or more.

The chain extender can contain, to the extent that does not damage the excellent effects of the present invention, as an optional component, other polyamines (polyamine excluding the alkoxysilyl compound having a primary amino group, or a primary amino group and a secondary amino group).

For the other polyamines, for example, aromatic polyamines, aralkyl polyamines, alicyclic polyamines, aliphatic polyamines, amino alcohols, and polyoxyethylene group-containing polyamines are used.

Examples of the aromatic polyamine include 4,4'-diphenylmethanediamine and tolylenediamine.

Examples of the aralkyl polyamine include 1,3- or 1,4-xylylene diamine, or mixtures thereof.

Examples of the alicyclic polyamine include 3-aminomethyl-3,5,5-trimethyl cyclohexylamine (also known as isophoronediamine), 4,4'-dicyclohexylmethanediamine, 2,5(2,6)-bis(aminomethyl)bicyclo[2.2.1]heptane, 1,4-cyclohexanediamine, 1-amino-3-aminomethyl-3,5,5-trimethylcyclohexane, bis-(4-aminocyclohexyl)methane, diaminocyclohexane, 3,9-bis(3-aminopropyl)-2,4,8,10-tetraoxaspiro[5,5]undecane, 1,3- and 1,4-bis(aminomethyl)cyclohexane, and mixtures thereof.

Examples of the aliphatic polyamine include ethylenediamine, propylene diamine, 1,3-propane diamine, 1,4-butanediamine, 1,5-pentanediamine, 1,6-hexamethylenediamine, hydrazine (including hydrate), diethylenetriamine, triethylenetetramine, tetraethylenepentamine, 1,2-diaminoethane, 1,2-diaminopropane, and 1,3-diaminopentane.

Examples of the amino alcohol include 2-((2-aminoethyl)amino)ethanol (also called: N-(2-aminoethyl)ethanolamine), and 2-((2-aminoethyl)amino)-1-methylpropanol (also called: N-(2-aminoethyl)isopropanolamine).

Examples of the polyoxyethylene group-containing polyamine include polyoxyalkylene etherdiamine such as polyoxyethylene etherdiamine. To be more specific, examples thereof include PEG #1000 diamine manufactured by NOF Corporation, Jeffamine ED-2003, EDR-148, and XTJ-512 manufactured by Huntsman Inc.

These other polyamines may be used singly or in combination of two or more.

For the other polyamine, preferably, amino alcohol is used.

The chain extender is preferably consisting of an alkoxysilyl compound having a primary amino group, or a primary amino group and a secondary amino group, and amino alcohol.

When the alkoxysilyl compound having a primary amino group, or a primary amino group and a secondary amino group is used in combination with other polyamine, for example, 1 part by mass or more, preferably 2 parts by mass or more, for example, 25 parts by mass or less, preferably 20 parts by mass or less of the alkoxysilyl compound having a primary amino group, or a primary amino group and a secondary amino group is mixed relative to 100 parts by mass of their total. The other polyamine is, for example, 75 parts by mass or more, preferably 80 parts by mass or more, and for example, 99 parts by mass or less, preferably 98 parts by mass or less relative to 100 parts by mass of their total.

To allow the isocyanate group-terminated prepolymer to react with the chain extender in water, for example, first, the isocyanate group-terminated prepolymer is added to water to disperse the isocyanate group-terminated prepolymer in water, and then the chain extender is added thereto, thereby extending the chains of the isocyanate group-terminated prepolymer with the chain extender.

To disperse the isocyanate group-terminated prepolymer in water, the isocyanate group-terminated prepolymer is added to water under stirring at a ratio of 100 to 1000 parts by mass of water relative to 100 parts by mass of the isocyanate group-terminated prepolymer.

Thereafter, the chain extender is dropped in the water in which the isocyanate group-terminated prepolymer is dispersed while stirring so that the equivalent ratio (active hydrogen group/isocyanate group) of the active hydrogen, group of the chain extender (amino group and hydroxyl group) relative to the isocyanate group of the isocyanate group-terminated prepolymer is, for example, 0.6 to 1.2.

The chain extender is allowed to react by dropping, and after the dropping, the reaction is completed while further mixing, for example, at normal temperature. The reaction time until the completion of reaction is, for example, 0.1 hour or more, and for example, 10 hours or less.

In contrast to the above-described method, water can be added in the isocyanate group-terminated prepolymer to disperse the isocyanate group-terminated prepolymer in water, and then a chain extender is added to the mixture to extend the chains of the isocyanate group-terminated prepolymer with the chain extender.

In this method, as necessary, the organic solvent and water can be removed, and furthermore, water can be added to adjust the solid content concentration.

The produced polyurethane dispersion of polyurethane resin has a solid content concentration of, for example, 10 mass % or more, preferably 15 mass % or more, more preferably 20 mass % or more, and for example, 60 mass % or less, preferably 50 mass % or less, more preferably 45 mass % or less.

The polyurethane dispersion has a pH of, for example, 5 or more, preferably 6 or more, and for example, 11 or less, preferably 10 or less.

The polyurethane dispersion has a viscosity at 25° C. of, for example, 3 mPa·s or more, preferably 5 mPa·s or more, and for example, 2000 mPa·s or less, preferably 1000 mPa·s or less.

The polyurethane dispersion has an average particle size of, for example, 10 nm or more, preferably 20 nm or more, and for example, 500 am or less, preferably 300 nm or less.

The polyurethane dispersion has a total of the urethane group concentration and the urea group concentration calculated based on the formulation of, for example, 20 mass % or more, preferably 25 mass % or more, and for example, 50 mass % or less, preferably 45 mass % or less.

The polyurethane dispersion has a Si content calculated based on the formulation of, for example, 0.02 mass % or more, preferably 0.05 mass % or more, and for example, 1.2 mass % or less, preferably 1.0 mass % or less.

Furthermore, as necessary, various additives can be blended. Examples of the additive include silane coupling agents, alkoxysilane compounds, stabilizers (antioxidants, heat stabilizers, ultraviolet ray absorbents, etc.), plasticizers, antistatic agents, lubricants, anti-blocking agents, surfactants, dispersion stabilizers, coloring agents (pigments, dyes, etc.), fillers, colloidal silica, inorganic particles, inorganic oxide particles, and crystal nucleating agents.

The additives can be blended in advance in the above-described material components, and can be blended in the synthesized isocyanate group-terminated prepolymer or the polyurethane resin, and furthermore, can be blended when the components are blended simultaneously.

The mixing ratio of the additives is not particularly limited, and is set suitably in accordance with the purpose and application.

As necessary, a thermoplastic resin having gas barrier properties can be blended to an extent that does not damage the gas barrier properties.

Examples of the thermoplastic resin having gas barrier properties include polyvinyl alcohol, an ethylene-vinyl alcohol copolymer, a polyvinylidene chloride or vinylidene chloride copolymer, starch, and polysaccharides such as cellulose.

The polyurethane dispersion contains the low-molecular-weight polyol having a functionality of three or more as the material component at a specific ratio, and therefore even if the alkoxysilyl compound having a primary amino group, or a primary amino group and a secondary amino group is blended as the chain extender, excellent dispersion properties can be ensured. Therefore, a polyurethane layer with excellent gas barrier properties and adherence can be formed excellently.

Therefore, the polyurethane dispersion of the present invention can be suitably used as a gas barrier layer in production of a polyurethane laminate including a polyurethane layer.

In FIG. 1, a polyurethane laminate 1 includes a substrate 2 and a polyurethane layer 3 laminated on the substrate 2.

The substrate 2 is not particularly limited, and formed from, for example, plastic (e.g., thermoplastic resin, thermosetting resin, etc.), paper, cloth, wood, metal, and ceramics, and preferably, plastic, more preferably, thermoplastic resin is used.

Examples of the thermoplastic resin include polyolefin resins (e.g., polyethylene, polypropylene, propylene-ethylene copolymer, etc.), polyester resins (e.g., polyethyleneterephthalate, polybutyleneterephthalate, polyethylenenaphthalate, etc.), polyamide resins (e.g., nylon 6 (registered trademark), nylon 66 (registered trademark), polymethaxylylene adipamide, etc.), vinyl resins (e.g., polyvinyl alcohol, ethylene-vinyl alcohol copolymer, polystyrene, polyvinyl acetate, etc.), acrylic resin (e.g., polymethylmethaacrylate, polyacrylonitrile, etc.), polycarbonate resins (e.g., bisphenol A polycarbonate, etc.), and cellulose resins (e.g., cellophane, acetic acid cellulose, etc.). Preferably, polyolefin resin, polyester resin, and polyamide resin are used. More preferably, polypropylene, polyethyleneterephthalate, and nylon 6 (registered trademark) are used.

The substrate 2 is composed of a laminate of a single layer, or layers of the same type or two or more types.

The shape of the substrate 2 is not particularly limited, and for example, the shape can be a film shape, a sheet shape, a bottle shape, and a cup shape. Preferably, the substrate 2 has a film shape.

The substrate 2 can be any of a non-drawn substrate, and uniaxially or biaxially drawn substrate, and the substrate 2 can be subjected to a surface treatment (corona discharge treatment, etc.), anchor coat or under coat treatment, and furthermore, can be subjected to a vapor deposition treatment with metal such as aluminium, and metal oxides such as silica, alumina, and a mixture of silica and alumina.

The substrate 2 has a thickness of, for example, 3 μm or more, preferably 5 μm or more, and for example, 500 μm or less, preferably 200 μm or less.

The polyurethane layer 3 is formed from the above-described polyurethane resin, and in view of production efficiency, preferably, the polyurethane layer 3 is formed by applying and drying the polyurethane dispersion including the above-described polyurethane resin on the substrate 2.

To be more specific, to form the polyurethane layer 3, the concentration of the polyurethane dispersion produced by the above described method is adjusted to prepare a coating agent. Then, the produced coating agent is applied on the substrate 2 and dried.

In adjustment of the polyurethane dispersion concentration, for example, a known method can be used, such as adding or eliminating water or a known organic solvent.

The coating agent has a solid content concentration of, for example, 0.5 mass % or more, preferably 1 mass % or more, and for example, 30 mass % or less, preferably 25 mass % or less.

As necessary, a curing agent can be blended to the coating agent.

Examples of the curing agent include epoxy curing agents, melamine curing agents, carbodiimide curing agents, aziridine curing agents, oxazoline curing agents, and isocyanate curing agents. Of these, examples of the isocyanate curing agents include, to be more specific, isocyanate curing agents having water dispersion properties (e.g., blocked isocyanate (e.g., tolylene diisocyanate blocked isocyanate, hexamethylenediisocyanate blocked isocyanate, xylylene diisocyanate blocked isocyanate, hydrogenated xylylene diisocyanate blocked isocyanate, etc.), and non-blocked polyisocyanate containing a hydrophilic group, etc.).

When the curing agent is blended, the mixing ratio thereof relative to 100 parts by mass of the polyurethane resin is, based on the curing agent solid content, for example, 0.1 parts by mass or more, preferably 1 part by mass or more, and for example, 50 parts by mass or less, preferably 30 parts by mass or less.

The method for applying the coating agent is not particularly limited, and for example, known coating methods such as gravure coating method, reverse coating method, roll coating method, bar coating method, spray coating method, air knife coating method, and dipping method can be used.

The coating agent can be applied in-line at the time of production of the substrate 2.

To be specific, when the substrate 2 is a film shape, after uniaxially drawing in the vertical direction at the time of film forming, the coating agent is applied and dried by, for example, gravure coating method, and the film can be biaxially drawn to provide the polyurethane layer 3 on the substrate 2.

When the substrate 2 has a bottle shape, the coating agent is applied on a preform before blow molding with, for example, dipping method, and dried, and then blow molding, thereby providing the polyurethane layer 3 on the substrate 2.

The drying conditions are as follows: the drying temperature of, for example, 40° C. or more, preferably 50° C. or more, and for example, 200° C. or less, preferably 180° C. or less. The drying time is, for example, 0.1 minute or more, preferably 0.2 minutes or more, and for example, 10 minutes or less, preferably 5 minutes or less.

In this manner, the polyurethane layer 3 made of the polyurethane resin can be formed on the substrate 2, and in this manner, the polyurethane laminate 1 including the substrate 2 and the polyurethane layer 3 can be produced.

The polyurethane layer 3 has a thickness of, as a lamination amount of the polyurethane resin (after drying), for example, 0.05 g/m$^2$ or more, preferably 0.1 g/m$^2$ or more, more preferably 0.2 g/m$^2$ or more, and for example, 10 g/m$^2$ or less, preferably 7 g/m$^2$ or less, more preferably 5 g/m$^2$ or less, further preferably 3 g/m$^2$ or less.

Then, as described above, by forming the polyurethane layer 3 on the substrate 2, the polyurethane laminate 1 can be produced.

The polyurethane laminate 1 has a thickness of, for example, 5 μm or more, preferably 10 μm or more, and for example, 1 mm or less, preferably 0.5 mm or less.

As necessary, the produced polyurethane laminate 1 can be aged, for example, at 30 to 50° C. for about 2 to 5 days.

The polyurethane laminate 1 includes the polyurethane layer 3 produced by using the above-described polyurethane dispersion, and therefore has excellent gas barrier properties and adherence. That is, the polyurethane layer 3 is a gas barrier layer, and has excellent adherence.

In the polyurethane laminate 1, to improve gas barrier properties, a layered inorganic compound can be dispersed in the polyurethane layer 3.

To be specific, for example, by applying the mixture of the above-described polyurethane dispersion and the layered inorganic compound on the substrate 2 and drying, a polyurethane layer 3 in which the layered inorganic compound is dispersed can be formed.

Examples of the layered inorganic compound include a swellable layered inorganic compound and a non-swellable layered inorganic compound. In view of gas barrier properties, preferably, swellable layered inorganic compound is used.

The swellable layered inorganic compound is composed of extremely thin crystal units, and is a clay mineral having characteristics of coordinating or absorbing and swelling the solvent between its crystal unit layers.

Examples of the swellable layered inorganic compound include, to be specific, for example, water-containing silicate (phyllosilicate mineral, etc.), for example, kaolinite clay minerals (halloysite, kaolinite, endellite, Dickite, nakhlite, etc.), antigorite clay minerals (antigorite, chrysotile, etc), smectite clay minerals (montmorillonite, beidellite, nontronite, saponite, hectorite, sauconite, stevensite, etc.), vermiculite clay minerals (vermiculite, etc.), mica clay minerals (micas such as muscovite and phlogopite, margarite, tetrasilylic mica, Taeniolite, etc.), and synthetic mica.

These swellable layered inorganic compounds may be a natural clay mineral or may be a synthetic clay mineral. These swellable layered inorganic compounds can be used singly, or can be used in combination of two or more, and preferably, smectite clay minerals (montmorillonite, etc.), mica clay minerals (water swellable mica, etc.), synthetic mica, and more preferably, synthetic mica is used.

The layered inorganic compound has an average particle size of, for example, 50 nm or more, preferably 1.00 nm or more, and usually 100 μm or less, for example, 75 μm or less, preferably 50 μm or less. The layered inorganic compound has an aspect ratio of, for example, 10 or more, preferably 20 or more, more preferably 100 or more, and for example, 5000 or less, preferably 4000 or less, more preferably 3000 or less.

To form a polyurethane layer 3 in which the layered inorganic compound is dispersed, for example, first, the above-described polyurethane dispersion and the layered inorganic compound are mixed to prepare a hybrid coating agent as a mixture. Then, the produced hybrid coating agent is applied on the substrate 2 and dried.

To prepare the mixture (hybrid coating agent), first, the layered inorganic compound is dispersed in water, and then the polyurethane dispersion (including polyurethane resin) is added to the dispersion liquid.

The mixing ratio of the polyurethane resin and the layered inorganic compound is as follows: the layered inorganic compound relative to 100 parts by mass of a total mass of the polyurethane resin and the layered inorganic compound is 0.1 parts by mass or more, preferably 1 part by mass or more, and for example, 50 parts by mass or less, preferably 30 parts by mass or less.

When the mixing ratio of the polyurethane resin and the layered inorganic compound is in the above-described range, gas barrier properties can be kept, and at the same time adherence to the substrate, transparency, and low costs can be improved.

In the produced mixture (hybrid coating agent), a total of the polyurethane resin and layered inorganic compound concentration is, for example, 0.1 mass % or more, preferably 0.5 mass % or more, and for example, 15 mass % or less, preferably 12 mass % or less.

In the mixture (hybrid coating agent), the layered inorganic compound sometimes undergo secondary aggregation, and therefore preferably, the layered inorganic compound is dispersed or mixed in the solvent, and thereafter dispersion is caused by using a mechanical and forceful dispersion treatment which involves shearing force, for example, by a homomixer, a colloid mill, a jet mill, a kneader, a bead mill, a sand mill, a ball mill, a three roll mill, and an ultrasonic dispersion device.

To the hybrid coating agent, as necessary, the above-described curing agent can be blended.

When blending the above-described curing agent, the mixing ratio the above-described curing agent relative to 100 parts by mass of the solid content of the total polyurethane resin is, based on solid content, for example, 0.1 parts by mass or more, preferably 1 part by mass or more, and for example, 50 parts by mass or less, preferably 30 parts by mass or less.

The hybrid coating agent can be applied without particular limitation, and the above-described known coating method can be used.

The drying conditions are, a drying temperature of, for example, 40° C. or more, preferably 50° C. or more and for example, 200° C. or less, preferably 180° C. or less. The drying time is, for example, 0.1 minute or more, preferably 0.2 minutes or more, and for example, 10 minutes or less, preferably 5 minutes or less.

In this manner, the polyurethane layer 3 made of the polyurethane resin and the layered inorganic compound can be formed on the substrate 2.

The polyurethane layer 3 has a thickness, as a layered amount of the polyurethane resin and the layered inorganic compound (after drying) of, for example, 0.1 g/m$^2$ or more, preferably 0.2 g/m$^2$ or more, more preferably 0.6 g/m$^2$ or more, and for example, 10 g/m$^2$ or less, preferably 7 g/m$^2$ or less, more preferably 5 g/m$^2$ or less.

Then, as described above, the polyurethane layer 3 is formed on the substrate 2, thereby forming the polyurethane laminate 1.

The polyurethane laminate 1 has a thickness of, for example, 5 μm or more, preferably 10 μm or more, and for example, 1 mm or less, preferably 0.5 mm or less.

In the polyurethane laminate 1, the mass ratio of the layered inorganic compound relative to 100 parts by mass of the total amount of the polyurethane layer 3 is, for example, 0.1 parts by mass or more, preferably 0.2 parts by mass or more, more preferably 1 part by mass or more, and for example, 90 parts by mass or less, preferably 70 parts by mass or less, more preferably 50 parts by mass or less.

When the layered inorganic compound has a mass ratio in the above-described range, adherence to the substrate and transparency can be improved, and the mixing ratio of the layered inorganic compound can be reduced, and therefore low costs can be improved.

Furthermore, as necessary, the produced polyurethane laminate 1 can be aged, for example, at 30 to 50° C. for about 2 to for 5 days.

The polyurethane laminate 1 includes the polyurethane layer 3 produced by using the above-described polyurethane dispersion, and the layered inorganic compound is dispersed in the polyurethane layer 3, and therefore has particularly excellent gas barrier properties.

Then, the thus produced polyurethane laminate 1 is excellent in, not only gas barrier properties, but also adherence to the substrate 2, transparency, and low costs. Therefore, in the field of the gas barrier properties film, to be specific, the thus produced polyurethane laminate 1 is used for a packing film for food and medical and pharmaceutical products, and also for a packing film for contents that requires boil sterilization, retort sterilization, and a heating treatment such as cooking with heat. The thus produced polyurethane laminate 1 is suitably used also in the fields of optical films and industrial films.

The thus produced polyurethane laminate 1 is suitably used also for printing film or printing medium, by preparing it as an ink for printing by including a coloring agent such as pigment to the above-described coating agent and the hybrid coating agent, and applying it to a plastic film, paper, and various vessels.

Figure 2:
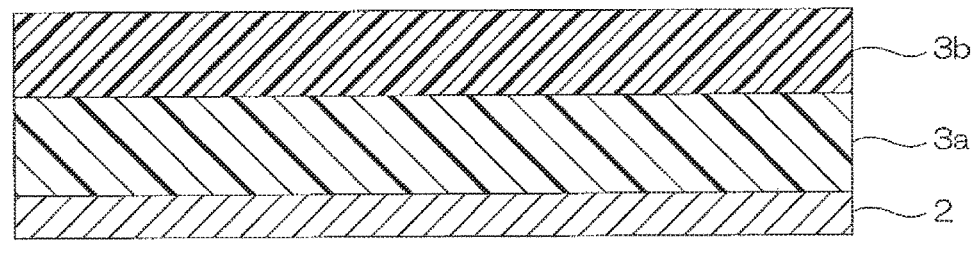
FIG. 2 is a schematic diagram illustrating another embodiment of the polyurethane laminate of the present invention.

In the description above, the polyurethane layer 3 was made to be a single layer, but for example, as shown in FIG. 2, the polyurethane layer 3 can be two layers of a first polyurethane layer 3a laminated on the substrate 2, and a second polyurethane layer 3b laminated on the first polyurethane layer 3a, and furthermore, although not shown, the polyurethane layer 3 can be a plurality of layers of three layers or more.

In the polyurethane laminate 1, when the layered inorganic compound is dispersed in the polyurethane layer 3, the layered inorganic compound can be dispersed in at least in any of the layers, and the layered inorganic compound can be dispersed in all of the layers. Also, the layered inorganic compound does not have to be dispersed in any of the layers.

For example, the polyurethane layer 3 can be two layers of a first polyurethane layer 3a laminated on the substrate 2, and a second polyurethane layer 3b laminated on the first polyurethane layer 3a, and the layered inorganic compound can be dispersed only in the second polyurethane layer 3b.

In the description above, the polyurethane layer 3 is laminated entirely on one side of the substrate 2 in the thickness direction, but it is not limited thereto, and for example, although not shown, the polyurethane layer 3 can be laminated on both sides of the substrate 2 in the thickness direction, and furthermore, the substrate 2 can be laminated partially.

EXAMPLES

In the following, the present invention is described based on Examples and Comparative Examples, but the present invention is not limited to Examples below. "Parts" and "%"

are based on mass unless otherwise specified in the following. The numeral values used in Examples below can be changed to corresponding numeral values used in embodiments (that is, upper limit value or lower limit value).

<Preparation of Polyurethane Dispersion (PUD)>

Example 1 (PUD 1)

143.3 g of TAKENATE 500 (1,3-xylylene diisocyanate, m-XDI, manufactured by Mitsui Chemicals Inc.), 25.0 g of Vestanat $H_{12}MDI$ (4,4-methylenebis(cyclohexyl isocyanate), $H_{12}MDI$), 28.1 g of ethylene glycol, 5.5 g of trimethylolpropane, 13.1 g of dimethylolpropionic acid, and 121.0 g of methyl ethyl ketone as a solvent were mixed (OH amount of low-molecular-weight polyol having a functionality of three or more/OH amount of total polyol component; 10/100 equivalent ratio) and reaction was performed in a nitrogen atmosphere at 65 to 70° C. until the NCO % was 6.12% or less, thereby producing a transparent isocyanate group-terminated prepolymer reaction solution.

Then, the produced reaction solution was cooled to 40° C., and thereafter, neutralized with 9.8 g of triethylamine.

Then, the reaction solution was dispersed in 839.9 g of ion-exchange water with a homodisper, and an aqueous amine solution in which 23.2 g of 2-((2-aminoethyl)amino) ethanol was dissolved in 46.5 g of ion-exchange water was added thereto.

Then, 2.1 g of N-2-(aminoethyl)-3-aminopropyltrimethoxysilane (trade name; KBM-603, manufactured by Shin-Etsu Chemical Co., Ltd.) was added, thereby causing chain extension reaction.

Thereafter, aging reaction was performed for 1 hour, methyl ethyl ketone and ion-exchange water were distilled off with an evaporator, and ion-exchange water was used to adjust the solid content to 25 mass %, thereby producing polyurethane dispersion 1 (PUD 1).

The produced polyurethane dispersion 1 (PUD 1) had a pH of 8.6, a viscosity of 15 mPa·s (25° C.), and an average particle size of 60 nm measured by Coulter counter N5 (manufactured by Beckman Coulter, Inc.). A total of the urethane group concentration and the urea group concentration was 39.7 mass % based on formulation, and the Si content was 0.10 mass %.

Example 2 (PUD 2)

142.4 g of TAKENATE 500 (1,3-xylylene diisocyanate, m-XDI, manufactured by Mitsui Chemicals Inc.), 24.8 g of Vestanat $H_{12}MDI$ (4,4'-methylenebis(cyclohexyl isocyanate), $H_{12}MDI$), 27.9 g of ethylene glycol, 5.4 g of trimethylolpropane, 13.1 g of dimethylolpropionic acid, and 120.2 g of methyl ethyl ketone as a solvent were mixed (OH amount of low-molecular-weight polyol having a functionality of three or more/OH amount of polyol component in total; 10/100 equivalent ratio), and reaction was performed in a nitrogen atmosphere at 65 to 70° C. until the NCO % was 6.12% or less, thereby producing a transparent isocyanate group terminated prepolymer reaction solution.

Then, the produced reaction solution was cooled to 40° C., and thereafter, neutralized with 9.7 g of triethylamine.

Then, the reaction solution was dispersed in 842.9 g of ion-exchange water with a homodisper, and an aqueous amine solution in which 21.7 g of 2-((2-aminoethyl)amino) ethanol was dissolved in 43.5 g ion-exchange water was added thereto.

Then, 5.0 g of N-2-(aminoethyl)-3-aminopropyltrimethoxysilane (trade name; KBM-603, manufactured by Shin-Etsu Chemical Co., Ltd.) was added, thereby causing chain extension reaction.

Thereafter, aging reaction was performed for 1 hour, methyl ethyl ketone and ion-exchange water were distilled off with an evaporator, and ion-exchange water was used to adjust the solid content to 25 mass %, thereby producing polyurethane dispersion 2 (PUD 2).

The produced polyurethane dispersion 2 (PUD 2) had a pH of 8.6, a viscosity of 15 mPa·s (25° C.), and an average particle size of 85 nm measured by Coulter counter N5 (manufactured by Beckman Couler, Inc.). A total of the urethane group concentration and the urea group concentration was 39.4 mass % based on formulation, and the Si content was 0.25 mass %.

Example 3 (PUD 3)

144.0 g, of TAKENATE 500 (1,3-xylylene diisocyanate, m-XDI, manufactured by Mitsui Chemicals Inc.), 25.1 g of Vestanat $H_{12}MDI$ (4,4'-methylenebis(cyclohexyl isocyanate), $H_{12}MDI$), 30.1 g of ethylene glycol, 1.5 g of glycerin, 14.0 g of dimethylolpropionic acid, and 121.2 g of methyl ethyl ketone as a solvent were mixed (OH amount of low-molecular-weight polyol having a functionality of three or more/OH amount of polyol component in total; 4/100 equivalent ratio), and reaction was performed in a nitrogen atmosphere at 65 to 70° C. until the NCO % was 6.15% or less, thereby producing a transparent isocyanate group-terminated prepolymer reaction solution.

Then, the produced reaction solution was cooled to 40° C., and thereafter, neutralized with 10.5 g of triethylamine.

Then, the reaction solution was dispersed in 838.7 g of ion-exchange water with a homodisper, and an aqueous amine solution in which 23.8 g of 2-((2-aminoethyl)amino) ethanol was dissolved in 47.7 g of ion-exchange water was added thereto.

Then, 1.0 g of N-2-(aminoethyl)-3-aminopropylmethyldimethoxysilane (trade name; KBM-602, manufactured by Shin-Etsu Chemical Co., Ltd.) was added, thereby causing chain extension reaction.

Thereafter, aging reaction was performed for 1 hour, methyl ethyl ketone and ion-exchange water were distilled off with an evaporator, and ion-exchange water was used to adjust the solid content to 25 mass %, thereby producing polyurethane dispersion 3 (PUD 3).

The produced polyurethane dispersion 3 (PUD 3) had a pH of 8.7, a viscosity of 12 mPa·s (25° C.), and an average particle size of 65 nm measured by Coulter counter N5 (manufactured by Beckman Coulter, Inc.). A total of the urethane group concentration and the urea group concentration was 39.9 mass % based on formulation, and the Si content was 0.05 mass %.

Example 4 (PUD 4)

165.3 g of TAKENATE 500 (1,3-xylylene diisocyanate m-XDI, manufactured by Mitsui Chemicals Inc.), 25.2 g of ethylene glycol, 1.6 g of trimethylolpropane, 4.5 g of glycerin, 14.6 g of dimethylolpropionic acid, and 119.6 g of methyl ethyl ketone as a solvent were mixed (OH amount of low-molecular-weight polyol having a functionality of three or more/OH amount of polyol component in total; 15/100 equivalent ratio), and reaction was performed in a nitrogen atmosphere at 65 to 70° C. until the NCO % was 6.92% or less, thereby producing a transparent isocyanate group-terminated prepolymer reaction solution.

Then, the produced reaction solution was cooled to 40° C., and thereafter, neutralized with 10.9 g of triethylamine.

Then, the reaction solution was dispersed in 834.3 g of ion-exchange water with a homodisper, and an aqueous amine solution in which 26.0 g of 2-((2-aminoethyl)amino)ethanol was dissolved in 52.1 g of ion-exchange water was added thereto.

Then, 1.8 g of N-2-(aminoethyl)-3-aminopropylmethyldimethoxysilane (trade name; KBM-602, manufactured by Shin-Etsu Chemical Co., Ltd.) was added, thereby causing chain extension reaction.

Thereafter, aging reaction was performed for 1 hour, methyl ethyl ketone and ion-exchange water were distilled off with an evaporator, and ion-exchange water was used to adjust the solid content to 25 mass %, thereby producing polyurethane dispersion 4 (PUD 4).

The produced polyurethane dispersion 4 (PUD 4) had a pH of 8.5, a viscosity of 15 mPa·s (25° C.), and an average particle size of 105 nm measured by Coulter counter N5 (manufactured by Beckman Coulter, Inc.). A total of the urethane group concentration and the urea group concentration was 40.6 mass % based on formulation, and the Si content was 0.10 mass %.

Example 5 (PUD 5)

168.2 g of TAKENATE 600 (1,3-bis(isocyanatomethyl)cyclohexane, $H_6XDI$, manufactured by Mitsui Chemicals Inc.), 29.7 g of ethylene glycol, 4.0 g of trimethylolpropane, 12.7 g of dimethylolpropionic acid, and 120.7 g of methyl ethyl ketone as a solvent were mixed (OH amount of low-molecular-weight polyol having a functionality of three or more/OH amount of polyol component in total; 7/100 equivalent ratio), and reaction was performed in a nitrogen atmosphere at 65 to 70° C. until the NCO % was 6.20% or less, thereby producing a transparent isocyanate group-terminated prepolymer reaction solution.

Then, the produced reaction solution was cooled to 40° C., and thereafter, neutralized with 9.5 g of triethylamine.

Then, the reaction solution was dispersed in 839.8 g of ion-exchange water with a homodisper, and an aqueous amine solution in which 23.3 g of 2-((2-aminoethyl)amino)ethanol was dissolved in 46.5 g of ion-exchange water was added thereto.

Then, 2.6 g of N-2-(aminoethyl)-3-aminopropyltrimethoxysilane (trade name; KBM-603, manufactured by Shin-Etsu Chemical Co., Ltd.) was added, thereby causing chain extension reaction.

Thereafter, aging reaction was performed for 1 hour, methyl ethyl ketone and ion-exchange water were distilled off with an evaporator, and ion-exchange water was used to adjust the solid content to 25 mass %, thereby producing polyurethane dispersion 5 (PUD 5).

The produced polyurethane dispersion 5 (PUT 5) had a pH of 8.7, a viscosity of 17 mPa·s (25° C.), and an average particle size of 95 nm measured by Coulter counter N5 (manufactured by Beckman Coulter, Inc.). A total of the urethane group concentration and the urea group concentration was 40.1 mass % based on formulation, and the Si content was 0.13 mass %.

Example 6 (PUD 6)

102.0 g of TAKENATE 600 (1,3-bis(isocyanatomethyl)cyclohexane, $H_6XDI$, manufactured by Mitsui Chemicals Inc.), 65.9 g of TAKENATE 500 (1,3-xylylene diisocyanate, m-XDI, manufactured by Mitsui Chemicals Inc.), 29.2 g of ethylene glycol, 2.9 g of pentaerythritol, 12.2 g of dimethylolpropionic acid, and 119.1 g of methyl ethyl ketone as a solvent were mixed (OH amount of low-molecular-weight polyol having a functionality of three or more/OH amount of polyol component in total; 7/100 equivalent ratio), and reaction was performed in a nitrogen atmosphere at 65 to 70° C. until the NCO % was 6.89% or less, thereby producing a transparent isocyanate group-terminated prepolymer reaction solution.

Then, the produced reaction solution was cooled to 40° C., and thereafter, neutralized with 9.1 g of triethylamine.

Then, the reaction solution was dispersed in 836.3 g of ion-exchange water with a homodisper, and an aqueous amine solution in which 25.0 g of 2-((2-aminoethyl)amino)ethanol was dissolved in 50.1 g of ion-exchange water was added thereto.

Then, 3.7 g of N-2-(aminoethyl)-3-aminopropylmethyldimethoxysilane (trade name; KBM-602, manufactured by Shin-Etsu Chemical Co., Ltd.) was added, thereby causing chain extension reaction.

Thereafter, aging reaction was performed for 1 hour, methyl ethyl ketone and ion-exchange water were distilled off with an evaporator, and ion-exchange water was used to adjust the solid content to 25 mass %, thereby producing polyurethane dispersion 6 (PUD 6).

The produced polyurethane dispersion 6 (PUD 6) had a pH of 8,8, a viscosity of 14 mPa·s (25° C.), and an average particle size of 70 nm measured by Coulter counter N5 (manufactured by Beckman Coulter, Inc.). A total of the urethane group concentration and the urea group concentration was 40.5 mass % based on formulation, and the Si content was 0.20 mass %.

Comparative Example 1 (PUD-H1)

143.0 g of TAKENATE 500 (1,3-xylylene diisocyanate, m-XDI, manufactured by Mitsui Chemicals Inc.), 24.9 g of Vestanat $H_{12}MDI$ (4,4'-methylenebis(cyclohexyl isocyanate), $H_{12}MDI$), 31.0 g of ethylene glycol, 14.7 g of dimethylolpropionic acid, and 121.0 g of methyl ethyl ketone as a solvent were mixed (OH amount of low-molecular-weight polyol having a functionality of three or more/OH amount of polyol component in total; 0/100 equivalent ratio), and reaction was performed in a nitrogen atmosphere at 65 to 70° C. until the NCO % was 6.13% or less, thereby producing a transparent isocyanate group-terminated prepolymer reaction solution.

Then, the produced reaction solution was cooled to 40° C., and thereafter, neutralized with 11.0 g of triethylamine.

Then, the reaction solution was dispersed in 840.0 g of ion-exchange water with a homodisper, and an aqueous amine solution in which 23.2 g of 2-((2-aminoethyl)amino)ethanol was dissolved in 46.9 g of ion-exchange water was added thereto.

Then, 2.1 g of N-2-(aminoethyl)-3-aminopropyltrimethoxysilane (trade name; KBM-603, manufactured by Shin-Etsu Chemical Co., Ltd.) was added, thereby causing chain extension reaction, and immediately after adding N-2-(aminoethyl)-3-aminopropyltrimethoxysilane, coagulation occurred due to dispersion failure, and excellent polyurethane dispersion could not be obtained.

Comparative Example 2 (PUD-H2)

144.3 g of TAKENATE 500 (1,3-xylylene diisocyanate, m-XDI, manufactured by Mitsui Chemicals Inc.), 25.1 g of Vestanat $H_{12}$MDI (4,4'-methylenebis(cyclohexyl isocyanate), $H_{12}$MDI), 22.5 g of ethylene glycol, 9.5 g of glycerin, 13.2 g of dimethylolpropionic acid, and 120.9 g of methyl ethyl ketone as a solvent were mixed (OH amount of low-molecular-weight polyol having a functionality of three or more/OH amount of polyol component in total; 25/100 equivalent ratio), and reaction was performed in a nitrogen atmosphere at 65 to 70° C. until the NCO % was 6.17% or less.

Then, the produced reaction solution was cooled to 40° C., and the reaction solution started to increase its viscosity while increasing its turbidity. Furthermore, although it was neutralized with 9.9 g of triethylamine, the turbidity still remained.

Thereafter, the turbid reaction solution was dispersed in 839.6 g of ion-exchange water with a homodisper, and an aqueous amine solution in which 23.4 g of 2-((2-aminoethyl)amino)ethanol was dissolved in 46.8 g of ion-exchange water was added thereto.

Then, 2.1 g of N-2-(aminoethyl)-3-aminopropyltrimethoxysilane (trade name; KBM-603, manufactured by Shin-Etsu Chemical Co., Ltd.) was added, thereby causing chain extension reaction. However, the turbid urethane prepolymer derived resin was not dispersed well, precipitation was caused, and excellent polyurethane dispersion could not be obtained.

Comparative Example 3 (PUD-H3)

143.9 g of TAKENATE 500 (1,3-xylylene diisocyanate, m-XDI, manufactured by Mitsui Chemicals Inc.), 25.1 g of Vestanat $H_{12}$MDI (4,4'-methylenebis(cyclohexyl isocyanate), $H_{12}$MDI), 28.2 g of ethylene glycol, 5.5 g of trimethylolpropane, 13.2 g of dimethylolpropionic acid, and 121.5 g of methyl ethyl ketone as a solvent were mixed (OH amount of low-molecular-weight polyol having a functionality of three or more/OH amount of polyol component in total; 10/100 equivalent ratio), and reaction was performed in a nitrogen atmosphere at 65 to 70° C. until the NCO % was 6.12% or less, thereby producing a transparent isocyanate group-terminated prepolymer reaction solution.

Then, the produced reaction solution was cooled to 40° C., and thereafter, neutralized with 9.8 g of triethylamine.

Then, the reaction solution was dispersed in 837.7 g of ion-exchange water with a homodisper, and an aqueous amine solution in which 24.3 g of 2-((2-aminoethyl)amino)ethanol was dissolved in 48.6 g of ion-exchange water was added, thereby causing chain extension reaction.

Thereafter, aging reaction was performed for 1 hour, methyl ethyl ketone and ion-exchange water were distilled off with an evaporator, and ion-exchange water was used to adjust the solid content to 25 mass %, thereby producing polyurethane dispersion 113 (PUD-H3).

The produced polyurethane dispersion H3 (PUD-H3) had a pH of 8.5, a viscosity of 12 mPa·s (25° C.), and an average particle size of 45 nm measured by Coulter counter N5 (manufactured by Beckman Coulter, Inc.). A total of the urethane group concentration and the urea group concentration was 39.8 mass % based on formulation, and Si was not contained.

The mixing formulations of Examples and Comparative Examples are shown in Table 1.

TABLE 1

| | | | No. | | | | |
|---|---|---|---|---|---|---|---|
| | | | Ex. 1 PUD1 | Ex. 2 PUD2 | Ex. 3 PUD3 | Ex. 4 PUD4 | Ex. 5 PUD5 |
| | Polyurethane dispersion | | | | | | |
| | Synthesis of isocyanate group-terminated prepolymer | | | | | | |
| Mixing formulation | 1,3-xylylene diisocyanate | XDI | 143.3 | 142.4 | 144.0 | 165.3 | — |
| | 4,4'-methylenebis(cyclohexyl isocyanate) | $H_{12}$MDI | 25.0 | 24.8 | 25.1 | — | — |
| | 1,3-bis(isocyanatomethyl)cyclohexane | $H_6$XDI | — | — | — | — | 168.2 |
| | ethylene glycol | EG | 28.1 | 27.9 | 30.1 | 25.2 | 29.7 |
| | trimethylolpropane | TMP | 5.5 | 5.4 | — | 1.6 | 4 |
| | glycerin | Gly | — | — | 1.5 | 4.5 | — |
| | pentaerythritol | PETL | — | — | — | — | — |
| | dimethylolpropionic acid | DMPA | 13.1 | 13.1 | 14.0 | 14.6 | 12.7 |
| | methyl ethyl ketone | MEK | 121.0 | 120.2 | 121.2 | 119.6 | 120.7 |
| | OH in low-molecular-weight polyol having a functionality of three or more/OH in polyol component (molar ratio) | | 10/100 | 10/100 | 4/100 | 15/100 | 7/100 |
| | NCO % after reaction | | 6.12 | 6.12 | 6.15 | 6.92 | 6.20 |
| | Status of reaction solution | | Excellent | Excellent | Excellent | Excellent | Excellent |
| | Neutralization treatment | | | | | | |
| | triethylamine | TEA | 9.8 | 9.7 | 10.5 | 10.9 | 9.5 |
| | Chain extension - water dispersion | | | | | | |
| | ion-exchange water | | 839.9 | 842.9 | 838.7 | 834.3 | 839.8 |
| | ion-exchange water for dilution | | 46.5 | 43.5 | 47.7 | 52.1 | 46.5 |
| | 2-[(2-aminoethyl)amino]ethanol | AEA | 23.2 | 21.7 | 23.8 | 26.0 | 23.3 |
| | N-2-(aminoethyl)-3-aminopropyl trimethoxysilane | KBM-603 | 2.1 | 5.0 | — | — | 2.6 |
| | N-2-(aminoethyl)-3-aminopropyl methyldimethoxysilane | KBM-602 | — | — | 1.0 | 1.8 | — |
| Physical properties | dispersion properties | | Excellent | Excellent | Excellent | Excellent | Excellent |
| | Si content (mass %) | | 0.10 | 0.25 | 0.05 | 0.10 | 0.13 |
| | urethane group and urea group concentration (mass %) | | 39.7 | 39.4 | 39.9 | 40.6 | 40.1 |
| | Solid content concentration (after solvent removal)(mass %) | | 25.0 | 25.0 | 25.0 | 25.0 | 25.0 |
| | Average particle size (nm) | | 60 | 85 | 65 | 105 | 95 |
| | pH | | 8.6 | 8.6 | 8.7 | 8.5 | 8.7 |
| | Viscosity (mPa·/s 25° C.) | | 15 | 15 | 12 | 15 | 17 |

TABLE 1-continued

| | Polyurethane dispersion | | Ex. 6 PUD6 | Comp. Ex. 1 PUD-H1 | Comp. Ex. 2 PUD-H2 | Comp. Ex. 3 PUD-H3 |
|---|---|---|---|---|---|---|
| | Synthesis of isocyanate group-terminated prepolymer | | | | | |
| Mixing formulation | 1,3-xylylene diisocyanate | XDI | 65.9 | 143.0 | 144.3 | 143.9 |
| | 4,4'-methylenebis(cyclohexyl isocyanate) | $H_{12}$MDI | — | 24.9 | 25.1 | 25.1 |
| | 1,3-bis(isocyanatomethyl)cyclohexane | $H_6$XDI | 102.0 | — | — | — |
| | ethylene glycol | EG | 29.2 | 31.0 | 22.5 | 28.2 |
| | trimethylolpropane | TMP | 2.9 | — | — | 5.5 |
| | glycerin | Gly | — | — | 9.5 | — |
| | pentaerythritol | PETL | 2.9 | — | — | — |
| | dimethylolpropionic acid | DMPA | 12.2 | 14.7 | 13.2 | 13.2 |
| | methyl ethyl ketone | MEK | 119.1 | 121.0 | 120.9 | 121.5 |
| | OH in low-molecular-weight polyol having a functionality of three or more/OH in polyol component (molar ratio) | | 7/100 | 0/100 | 25/100 | 10/100 |
| | NCO % after reaction | | 6.89 | 6.13 | 6.17 | 6.12 |
| | Status of reaction solution | | Excellent | Excellent | Increased viscosity and turbidity after cooling | Excellent |
| | Neutralization treatment | | | | | |
| | triethylamine | TEA | 9.1 | 11 | 9.9 | 9.8 |
| | Chain extension - water dispersion | | | | | |
| | ion-exchange water | | 836.3 | 840 | 839.6 | 837.7 |
| | ion-exchange water for dilution | | 50.1 | 46.9 | 46.8 | 48.6 |
| | 2-[(2-aminoethyl)amino]ethanol | AEA | 25.0 | 23.2 | 23.4 | 24.3 |
| | N-2-(aminoethyl)-3-aminopropyl trimethoxysilane | KBM-603 | — | 2.1 | 2.1 | — |
| | N-2-(aminoethyl)-3-aminopropyl methyldimethoxysilane | KBM-602 | 3.7 | — | — | — |
| Physical properties | dispersion properties | | Excellent | Aggregated | Precipitated | Excellent |
| | Si content (mass %) | | 0.20 | — | — | 0.00 |
| | urethane group and urea group concentration (mass %) | | 40.5 | — | — | 39.8 |
| | Solid content concentration (after solvent removal)(mass %) | | 25.0 | — | — | 25 |
| | Average particle size (nm) | | 70 | — | — | 45 |
| | pH | | 8.8 | — | — | 8.5 |
| | Viscosity (mPa ·/s 25° C.) | | 14 | — | — | 12 |

Example 6 (Polyurethane Laminate)

40 g of PUD1 was stirred with a magnetic stirrer, and 45 g of ion-exchange water and 15 g of 2-propanol were gradually added, thereby preparing a coating liquid 1.

The coating liquid 1 was applied to coat an alumina vapor deposition PET film (Barrialox 1011HG (#12), manufactured by Toray advanced film Co., Ltd.) as a substrate using a bar coater so that the dried thickness was 0.5 g/m², and put into a drying oven with a temperature setting of 130° C. to dry for 1 minute, thereby forming a polyurethane layer on the surface of the substrate. The laminate 1 was produced in this manner.

Examples 7 to 11, Comparative Example 4

The coating liquids 2 to 7 were prepared in the same manner as in Example 6, except that the mixing formulations shown in Table 2 were used, thereby producing laminates 2 to 7.

Example 12

20 g of water swellable inorganic layered compound slurry (MEB-3 solid content 8 mass %) manufactured by Katakura & Co-op Agri Corporation) was added to 57.2 g of ion-exchange water, and the mixture was stirred with a magnetic stirrer for 10 minutes. Thereafter, 21.9 g of PUD 1 was gradually added, and the mixture was stirred for 20 minutes.

Then, 0.9 g of TAKENATE WD-725 (manufactured by Mitsui Chemicals Inc.), water dispersible polyisocyanate, was added, and the mixture was further mixed for 20 minutes, thereby producing a coating liquid 8.

The produced coating liquid 8 was applied to coat biaxially oriented polypropylene film (PYLEN film-OT P2161 (OPP film, #20), manufactured by TOYOBO CO., LTD.) as a substrate using a bar coater so that the dried thickness was 1.0 g/m², and put into a drying oven with a temperature setting of 80° C. to dry for 2 minutes, and aged at 40° C. for 3 days, thereby forming a polyurethane layer on the surface of the substrate. The laminate 8 was produced in this manner.

Examples 13 to 16

Coating liquids 9 to 12 were prepared in the same manner as in Example 12, except that the mixing formulations shown in Table 2 were used, thereby preparing laminates 9 to 12.

Evaluation

<Oxygen Transmission Measurement>

The oxygen transmission amount at 20° C. under relative humidity of 80% (80% RH) per 1 m², 1 day, and 1 atmospheric pressure was measured for the laminates using an oxygen transmission rate (OTR) testing system (OX-TRAN2/20, manufactured by MOCON, Inc.).

The results are shown in Table 2.

<Measurement of Adherence (Laminate Strength)>

A mixture (TAKENATE A-969 V/TAKENATE A-5=3/1 (mass ratio)) of TAKENATE A-969 V (manufactured by Mitsui Chemicals Inc.) and TAKENATE A-5 (manufactured by Mitsui Chemicals Inc.) as a dry laminating adhesive was applied on coating surfaces of the laminates so that the dried thickness was 3.0 g/m² using a bar coater, and dried with a dryer.

Thereafter, a nonoriented polypropylene film (Tohcello CP RXC-22 (CPP film, #60), manufactured by Mitsui Chemicals Tohcello.Inc.) was laminated thereto, and aged at 40° C. for 3 days. Thereafter, laminate strength between the substrate and the polyurethane layer of the laminates was measured by T-peel test (15 mm width) in conformity with JIS K 6854. The results are shown in Table 2.

TABLE 2

| | | Example 6 | Example 7 | Example 8 | Example 9 | Example 10 | Example 11 |
|---|---|---|---|---|---|---|---|
| | | Coating liquid 1 | Coating liquid 2 | Coating liquid 3 | Coating liquid 4 | Coating liquid 5 | Coating Liquid 6 |
| Mixing Formulation | PUD1 | 40 | — | — | — | — | — |
| | PUD2 | — | 40 | — | — | — | — |
| | PUD3 | — | — | 40 | — | — | — |
| | PUD4 | — | — | — | 40 | — | — |
| | PUD5 | — | — | — | — | 40 | — |
| | PUD6 | — | — | — | — | — | 40 |
| | PUD-H3 | — | — | — | — | — | — |
| | ion-exchange water | 45 | 45 | 45 | 45 | 45 | 45 |
| | 2-propanol | 15 | 15 | 15 | 15 | 15 | 15 |
| | TAKENATE WD-725(Curing agent) | — | — | — | — | — | — |
| | TAKENATE XWD-HS7(Curing agent) | — | — | — | — | — | — |
| | MEB-3(inorganic layered compound) | — | — | — | — | — | — |
| Substrate film | | alumina vapor deposition PET | alumina vapor deposition PET | alumina vapor deposition PET | alumina vapor deposition PET | alumina vapor deposition PET | alumina vapor deposition PET |
| Laminate No. | | Laminate 1 | Laminate 2 | Laminate 3 | Laminate 4 | Laminate 5 | Laminate 6 |
| Evaluation | Oxygen transmission (cc/m² · day · atm) | 0.2 | 0.3 | 0.3 | 0.2 | 0.4 | 0.4 |
| | Laminate strength (N/15 mm) | 4.0 | 4.2 | 3.8 | 3.9 | 3.9 | 3.7 |

| | | Comp. Ex. 4 | Example 12 | Example 13 | Example 14 | Example 15 | Example 16 |
|---|---|---|---|---|---|---|---|
| | | Coating Liquid 7 | Coating liquid 8 | Coating liquid 9 | Coating liquid 10 | Coating liquid 11 | Coating liquid 12 |
| Mixing Formulation | PUD1 | — | 21.9 | — | — | — | — |
| | PUD2 | — | — | 24 | — | — | — |
| | PUD3 | — | — | — | 24 | — | — |
| | PUD4 | — | — | — | — | 25.8 | — |
| | PUD5 | — | — | — | — | — | 25.4 |
| | PUD6 | — | — | — | — | — | — |
| | PUD-H3 | 40 | — | — | — | — | — |
| | ion-exchange water | 45 | 57.2 | 62.5 | 62.3 | 61.2 | 66.0 |
| | 2-propanol | 15 | — | — | — | — | — |
| | TAKENATE WD-725(Curing agent) | — | 0.9 | 1 | — | 0.5 | 1.1 |
| | TAKENATE XWD-HS7(Curing agent) | — | — | — | 1.2 | — | — |
| | MEB-3(inorganic layered compound) | — | 20 | 12.5 | 12.5 | 12.5 | 7.5 |
| Substrate film | | alumina vapor deposition PET | OPP | OPP | OPP | OPP | OPP |
| Laminate No. | | Laminate 7 | Laminate 8 | Laminate 9 | Laminate 10 | Laminate 11 | Laminate 12 |
| Evaluation | Oxygen transmission (cc/m² · day · atm) | 0.2 | 1.2 | 4.2 | 3.6 | 3.6 | 5.8 |
| | Laminate strength (N/15 mm) | 3.3 | 0.6 | 1.2 | 1.0 | 0.8 | 1.3 |

The abbreviations used in Tables are shown below.
TAKENATE WD-725: water dispersible polyisocyanate (curing agent), manufactured by Mitsui Chemicals
TAKENATE XWD-HS7: water dispersible polyisocyanate (curing agent), manufactured by Mitsui Chemicals
MEB-3: water swellable inorganic layered compound slurry, solid content 8 mass %, manufactured by Co-op Agri Corporation
PET: Barrialox 1011HG (#12), manufactured by Toray advanced film Co., Ltd.
OPP: biaxially oriented polypropylene film, PYLEN film-OT P2161 (OPP film, #20), manufactured by TOYOBO CO., LTD.

While the illustrative embodiments of the present invention are provided in the above description, such is for illustrative purpose only and it is not to be construed restrictively. Modification and variation of the present invention that will be obvious to those skilled in the art is to be covered by the following claims.

INDUSTRIAL APPLICABILITY

The polyurethane dispersion and polyurethane laminate of the present invention are suitably used in, for example, a packing film used in the field of gas barrier properties film, to be specific, used in food and medical and pharmaceutical products, and also for a packing film for contents that require boil sterilization, retort sterilization, and a heating treatment such as cooking with heat. The polyurethane dispersion and polyurethane laminate of the present invention are suitably used also in the fields of optical films and industrial films.

DESCRIPTION OF REFERENCE NUMERALS

1 Polyurethane laminate
2 Substrate
3 Polyurethane layer

The invention claimed is:
1. A polyurethane dispersion for forming a gas barrier layer, in which polyurethane resin produced by reaction of an isocyanate group-terminated prepolymer with a chain extender is dispersed in water, wherein:
   the isocyanate group-terminated prepolymer is produced by at least allowing a polyisocyanate component containing xylylene diisocyanate and/or hydrogenated xylylene diisocyanate, to react with a polyol component containing an alkanediol having 2 to 6 carbon atoms, a low-molecular-weight polyol having a functionality of three or more, and an active hydrogen group-containing compound containing a hydrophilic group;
   the chain extender contains an alkoxysilyl compound having a primary amino group, or a primary amino group and a secondary amino group; and
   the molar ratio of the hydroxyl group in the low-molecular-weight polyol having a functionality of three or more is less than 25% relative to the total mol 100% of the hydroxyl group in the polyol component.
2. A polyurethane laminate comprising:
   a substrate, and
   a polyurethane layer laminated on the substrate, and made of a polyurethane resin,
   wherein the polyurethane layer is formed by applying and drying the polyurethane dispersion for forming a gas barrier layer according to claim 1 on the substrate.

3. The polyurethane laminate according to claim 2, wherein a layered inorganic compound is dispersed in the polyurethane layer.
4. The polyurethane dispersion for forming a gas barrier layer according to claim 1, wherein 20-50 parts by mass of the active hydrogen group-containing compound containing the hydrophilic group is mixed relative to 100 parts by mass of a total of the polyol component.
5. The polyurethane dispersion for forming a gas barrier layer according to claim 1, wherein 55-75 parts by mass of the alkanediol having 2 to 6 carbon atoms is mixed relative to 100 parts by mass of a total of the polyol component.
6. The polyurethane dispersion for forming a gas barrier layer according to claim 5, wherein the molar ratio of the hydroxyl group in the alkanediol having 2 to 6 carbon atoms is less than 50-90% relative to the total mol 100% of the hydroxyl group in the polyol component.
7. The polyurethane dispersion for forming a gas barrier layer according to claim 1, wherein:
   the polyisocyanate component includes the xylylene diisocyanate and bis(isocyanatocyclohexyl) methane; and
   60-95 parts by mass of the xylylene diisocyanate is mixed relative to 100 parts by mass of a total amount of the xylylene diisocyanate and the bis(isocyanatocyclohexyl) methane.
8. The polyurethane dispersion for forming a gas barrier layer according to claim 1, wherein 8-35 parts by mass of the low-molecular-weight polyol having a functionality of three or more is mixed relative to 100 parts by mass of a total of the polyol component.
9. The polyurethane dispersion for forming a gas barrier layer according to claim 1, wherein a molar ratio of the hydroxyl group in the active hydrogen group-containing compound containing a hydrophilic group is 7-35% relative to a total mol 100% of the hydroxyl group in the polyol component.
10. The polyurethane dispersion for forming a gas barrier layer according to claim 1, wherein the polyurethane dispersion has an equivalent ratio of isocyanate groups to active hydrogen groups of 1.1-10.
11. The polyurethane dispersion for forming a gas barrier layer according to claim 1, wherein:
   the chain extender further includes an amino alcohol; and
   1-25 parts by mass of the alkoxysilyl compound having a primary amino group, or a primary amino group and a secondary amino group is mixed relative to 100 parts by mass of a total amount of the amino alcohol and the alkoxysilyl compound having a primary amino group, or a primary amino group and a secondary amino group.
12. The polyurethane dispersion for forming a gas barrier layer according to claim 1, wherein the active hydrogen group-containing compound containing a hydrophilic group is polyhydroxy alkanoic acid.
13. The polyurethane dispersion for forming a gas barrier layer according to claim 1, wherein the alkanediol having 2 to 6 carbon atoms is selected from the group consisting of ethylene glycol, propylene glycol, 1,3-propanediol, 1,4-butyleneglycol, 1,3-butyleneglycol, 1,2-butyleneglycol, 1,5-pentanediol, 1,6-hexanediol, neopentyl glycol, 3-methyl-1,5-pentanediol, and 1,3- or 1,4-cyclohexanediol.

* * * * *